Jan. 5, 1932.  A. C. VAN HOUWELING ET AL  1,839,906
MECHANISM FOR OPERATING SIGNAL SWITCHES
Filed July 2, 1929
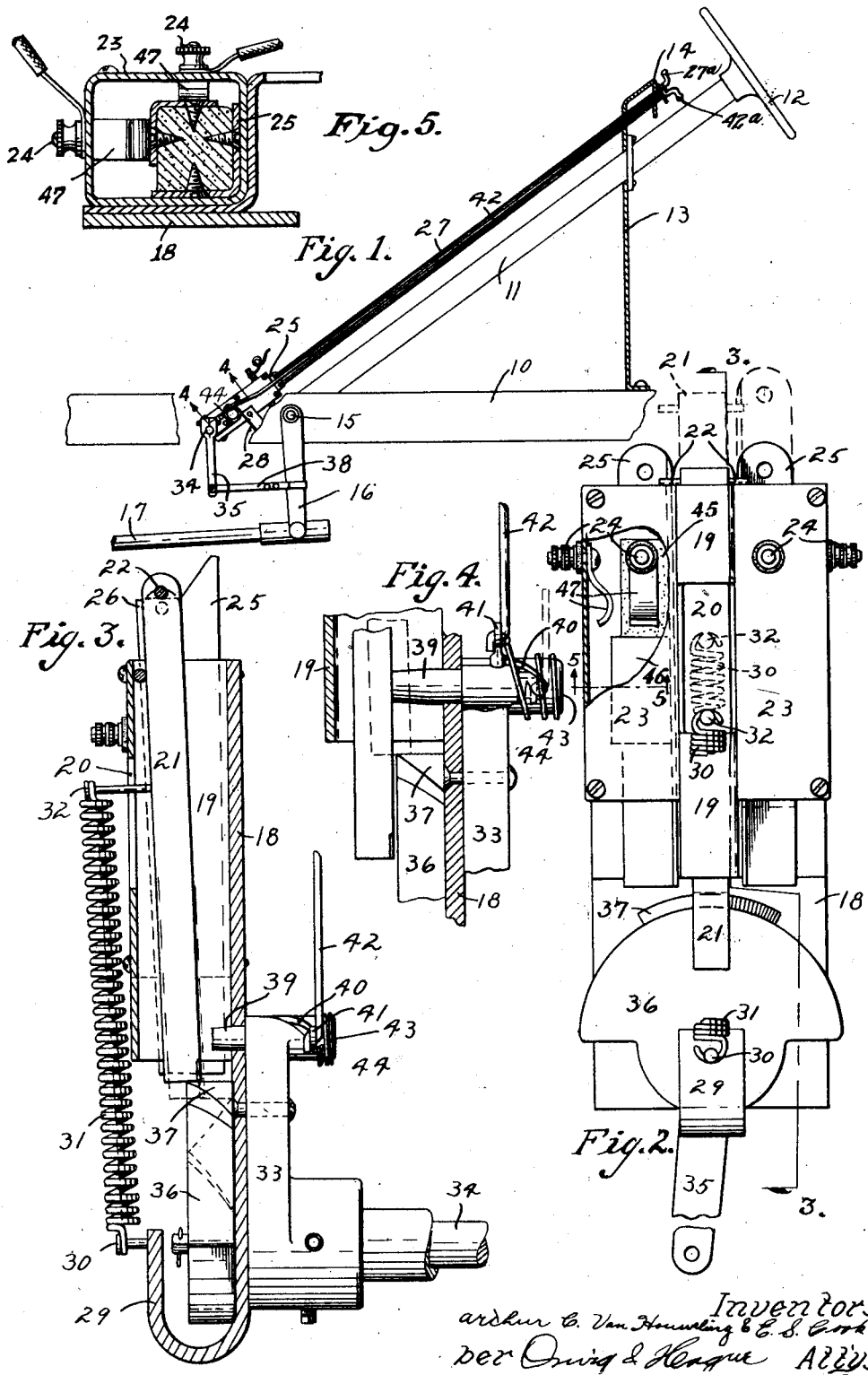

Patented Jan. 5, 1932

1,839,906

UNITED STATES PATENT OFFICE

ARTHUR C. VAN HOUWELING AND EDWARD S. COOK, OF PELLA, IOWA

MECHANISM FOR OPERATING SIGNAL SWITCHES

Application filed July 2, 1929. Serial No. 375,365.

This invention relates to improvements in devices adapted to operate electric switches of that type used in the signal systems applied to automobiles, and is particularly adapted to be used in connection with electric signal lights for indicating right and left turns.

The object of our invention is to provide a mechanism of simple, durable and inexpensive construction, which may be easily and quickly applied to the ordinary automobile having right and left signal lamps and switches for controlling same, and in operative relation with the steering mechanism of the automobile whereby either the right or left signal lamp may be manually thrown into circuit before the operator makes a turn, and whereby the signal switch will be automatically opened after the steering mechanism of the automobile has been moved to position where the automobile will be advanced in a straight line.

A further object of our invention is to provide in a switch operating mechanism as above described means whereby the closed signal switch may be manually opened independently of the automatic mechanism.

Our invention consists in the construction, arrangement and combination of the various parts of the device, whereby the objects contemplated are attained, as hereinafter more fully set forth, pointed out in our claims, and illustrated in the accompanying drawings, in which:

Figure 1 shows a segmental portion of an automobile frame and a steering column and a portion of the steering mechanism for the automobile, and the manner in which our improved device is applied thereto.

Figure 2 is an enlarged side elevation of the rear of our improved mechanism.

Figure 3 is a detail sectional view taken on the line 3—3 of Figure 2.

Figure 4 is a detail sectional view taken on the line 4—4 of Figure 1.

Figure 5 is a detail sectional view taken on the line 5—5 of Figure 2.

The reference numeral 10 indicates the frame member of an automobile chassis, and 11 the steering column having a steering wheel 12 at its upper end. Said column is mounted in the dash board 13, having an instrument board 14 of ordinary construction at its upper end. Pivotally mounted in the frame 10 is a steering shaft 15 of ordinary construction, operated by the wheel 12. Secured to the shaft 15 is a downwardly extending steering arm 16 to which is pivotally connected a steering link 17.

The parts are so arranged that as the wheel 12 is rotated, the arm 16 will be rocked forwardly to steer the automobile in one direction, and rearwardly to steer the automobile in the opposite direction.

Our improved device comprises a base plate 18. The center of the upper face of said base plate is provided with a hollow casing 19 having an opening 20 in its upper side. The casing 19 is designed to slidably receive a bar 21, the upper end of which projects upwardly beyond the upper end of the casing 19 and is provided with a transversely arranged pin 22, the end of said pin projecting laterally therefrom.

Supported on the base plate 18 adjacent to each side of the casing 19 is a switch box 23 provided with the usual terminals 24. Each set of said terminals is designed to be included in an electric circuit containing a signal light. One of the circuits is designed to operate the left signal, and the other one the right signal. The signal lamps and circuits are not illustrated, as they form no part of our present invention and may be any of the common signal lamps and circuits in commercial use.

Each of the signal boxes 23 is provided with a slide bar 25 designed to be moved upwardly to close the signal circuit, and to be moved to its lower position to open the circuit. Each bar 25 is provided with an insulating block 45 having a contact plate 46. Said plate is designed to engage springs 47 supported by the terminals 24 when the bar 25 is at its upper limit of movement. Each of the bars 25 is provided with a shoulder 26 designed to be engaged by the pins 22 of the slide bars 21, as the said slide bars are operated.

Each of the slide bars 25 are provided with an operating rod 27, preferably mounted parallel with, and either above or below, the steering post 11, and terminates slightly beyond the instrument board 14 in a handle 27ª. The plate 18 is rigidly secured to the frame 10 by a suitable bracket 28 and near the shaft 15.

The lower end of the plate 18 is provided with a curved portion 29, having a pin 30 to which one end of a spring 31 is connected. The other end of the spring 31 is connected to a pin 32 extending inwardly through the slot 20 of the casing 19, and mounted in the slide bar 21.

The casing 19 is of such depth as to permit a considerable lateral movement of the slide bar 21 in said casing. The pin 22 is designed to rest against the upper faces of the bars 25 in such a manner that tension on the pin 32 will cause the lower end of the slide bar 21 to move toward the plate 18.

Supported adjacent to the under face of the lower end of the plate 18 is a bracket 33 in which is rotatively mounted a shaft 34, the outer end of which is provided with a downwardly extending arm 35, and the inner end with a cam plate 36 supported adjacent to the front face of the plate 18, in such manner as to support the lower end of the bar 21 when said bar is at its inner and upper positions of movement. Said cam is of such width as to permit the lower end of the bar 21 to slide downwardly past the upper face when said lower end is at its outer position of movement. The peripheral edge of said cam is circular and concentric with the shaft 34 and of an angular length equal to substantially 180°.

Supported on the upper and central portion of the periphery of the cam 36 is a second cam face 37, the central portion of which is of substantially the same width as the plate 36, the upper face tapering inwardly so that a substantially V-shaped cam is formed, as viewed from the upper end of the plate 18.

The lower end of the lever 35 is operatively connected with the lever 16 by means of a link 38, in such a manner that as the steering arm 16 is oscillated, the cam plate 36 will also be oscillated. The said cam plate 36 assumes the position illustrated in Figure 2, at the time the automobile is being advanced in a straight line. It will readily be seen that if the automobile is steered to the left, the cam 37 will be swung in one direction, and in the opposite direction if the automobile is steered to the right.

The operation of this part of our device is as follows:

Assuming that the automobile is being advanced in a straight line, and it is desired to turn either to the left or right, then the member 27ª of one of the rods 27 is grasped and pulled upwardly toward the steering wheel 12. This will cause the shoulder 26 of the slide bar 25 to engage one end of the pin 22, and the slide bar 21 to be moved upwardly in unison with the slide bar 25 being operated, until the lower end of the slide bar 21 is slightly above the cam 37. The tension on the spring 31 will then move the lower end of the bar 21 inwardly to position to engage the top face of the cam 37. The upward movement of the bar 25 will close the circuit of the particular lamp in which the corresponding switch is included. Friction between the springs 47 and the plate 46 retains the bar 25 in said elevated position.

The operator then operates the steering wheel 12 to cause a turn to be made, which in turn will rotate the plate 36 in the manner before described, causing the member 37 to be moved from beneath the lower end of the slide bar 21, which will then engage the periphery of the member 36 and cause a slight downward movement of the bar 21. This, however, is not sufficient to open the switch connected with the bar 25.

Further turning movement of the automobile will not effect the movement of the bar 21, and consequently the switch will remain closed until after the turn has been made, and after the steering mechanism has again been partially moved to a straight position, at which time the inclined face of the cam 37 will engage the inner edge of the bar 21, causing the lower end of said bar to be moved outwardly to position outside of the outer face of the plate 36 just as the steering wheel is moved to a straight position. The spring 32 will then move the bar 21 downwardly and with it the bar 25, opening the signal switch, thereby providing means whereby the signal switch will be automatically opened as the steering mechanism of the automobile assumes a straight position.

We have provided means whereby the switch may be manually moved to an open position after it has been closed, which might be desirable in case the operator should change his mind after setting the switch and wish to continue in a straight line.

This means comprises a pin 39 rotatively mounted in the upper end of the bracket 33, having its outer end adapted to engage the inner face of the bar 21. The upper end of the bracket 33 is provided with a helical groove 40 for receiving a laterally projecting pin 41 carried by the inner end of the pin 39 in such manner that rotary movement of the pin 41 about the longitudinal axis of the pin 39 will cause said pin to be moved longitudinally and toward and from the bar 21. A rod 42 is pivotally connected to the pin 41, which also projects upwardly into the instrument board 14 where it may be grasped by the operator by means of a lever 42ª. A spring 43 is wound about the outer end of the housing 44, one end of which is connected to said housing and the other end to the pin 41, in such manner that the pin 41 will be yieldably retained in the inner end of the slot 40, to thereby normally retain the pin 39 in its inner limit of movement.

It will readily be seen that upward movement of the rod 42 will cause the pin 39 to be moved outwardly and the bar 21 to disengage the cams 36 and 37.

Thus it will be seen that we have provided a device of simple, durable and inexpensive construction, which may be easily and quickly applied to an automobile of ordinary make, and in operative relation with the steering mechanism, in such manner that either of the signal switches may be automatically opened after they have been manually closed by the steering mechanism moved to its normal and straight position, and also means has been provided whereby the switches may be manually opened regardless of the automatic means.

We claim as our invention:

1. In combination, an automobile frame having a steering gear supported thereon, said steering gear including a movable member for imparting steering movement to said gear, a supporting plate, a pair of switch operating bars slidably mounted on said plate, and adapted to be moved to open and closed positions, hand actuated means for each of said switch operating bars for moving said bars to a closed position, a latch bar slidably mounted between the switch operating bars, said latch bar having a pin for engaging the upper ends of the switch operating bars and for moving them downwardly to an open position, a cam shaft, a cam for said shaft, said cam being located to support the lower end of said latch bar against downward movement, yieldable means for imparting downward movement to said latch bar and for moving the lower end of said latch bar into engagement with said cam when it is at its upper limit of movement, and to retain the said latch bar at its upper limit of movement as the cam is rotated from its normal position in either direction to cause said latch bar to disengage the cam as said cam is returned to its normal position of movement, and means for operatively connecting said cam shaft with said steering arm.

2. In combination, an automobile frame having a steering gear supported thereon, said steering gear including a movable member for imparting steering movement to said gear, a supporting plate, a pair of switch operating bars slidably mounted on said plate, and adapted to be moved to open and closed positions, hand actuated means for each of said switch operating bars for moving said bars to a closed position, a latch bar slidably mounted between the first said bars, said latch bar having a pin for engaging the upper ends of the switch operating bars to move them downwardly to an open position, a cam shaft, a cam for said shaft, said cam being located to support the lower end of said latch bar against downward movement, yieldable means for imparting downward movement to said latch bar and for moving the lower end of said latch bar into engagement with said cam when it is at its lower limit of movement, and to retain the said latch bar at its upper limit of movement as the cam is rotated from its normal position in either direction and to cause said latch bar to disengage the cam as said cam is returned to its normal position of movement, means for operatively connecting said cam shaft with said steering arm, and hand actuated means for disengaging said latch bar from said cam independently of the automatic means for releasing said latch bar.

3. In a device of the class described, a supporting plate having a narrow casing supported centrally on one of its faces, said casing being provided with a slot, a switch actuating bar slidably mounted adjacent to each side of said casing and longitudinally therewith, each of said actuating bars having on its upper end a shoulder, a latch bar slidably mounted in said casing, a pin carried by the upper end of said latch bar for engaging said shoulders and for returning said actuating bars to an open position, a pin projecting outwardly through the slot of said casing carried by said latch bar, a spring having one end secured to said pin and its opposite end fixed to said supporting plate to cause the said latch bar to be moved downwardly and its lower end to be moved inwardly toward said plate, a cam shaft rotatively mounted in the lower end of said plate, a cam for said cam shaft, having a circular cam face concentric with said cam shaft, the central portion of said cam face including a second cam face having its outer edge inclined inwardly toward each end, hand actuated means for moving either of said switch actuating bars to a closed position and for moving the lower end of said latch bar to position in engagement with the periphery of the second cam face and to be yieldably retained thereon by said spring, means actuated by the steering mechanism of an automobile for rotating said cam in either direction and to cause the latch bar to disengage the second cam member and to engage the first cam member, the inclined face of said cam member being adapted to engage the inner edge of said latch bar as the said cam is returned to its normal position to disengage said latch bar and to permit said switch actuating members to be moved to open position.

4. In a device of the class described, a supporting plate having a narrow casing supported centrally on one of its faces, said casing being provided with a slot, a switch actuating bar slidably mounted adjacent to each side of said casing and longitudinally therewith, each of said switch bars having on its upper end a shoulder, a latch bar slidably mounted in said casing, a pin carried by the upper end of said latch bar for engaging said shoulders and for returning said switch bars to an open position, a pin projecting outwardly through the slot of said casing carried by said latch bar, a spring having one end secured to said pin and its other end fixed to said supporting plate to cause the said latch bar to be moved downwardly and its lower end to be moved inwardly toward said plate, a cam shaft rotatively mounted in the lower end of said plate, a cam for said cam shaft having a circular cam face concentric with said cam shaft, the central portion of said cam face including a second cam face having its outer edge inclined inwardly toward each end, hand actuated means for moving either of said switch actuating bars to a closed position and for moving the lower end of said latch bar to position in engagement with the periphery of the second cam face and to be yieldably retained thereon by said spring, means actuated by the steering mechanism of an automobile for rotating said cam in either direction and to cause the latch bar to disengage the second cam member and engage the first cam member, the inclined face of said second cam member being adapted to engage the inner edge of said latch bar as the said cam is returned to its normal position to disengage the said latch bar and to permit said switch actuating members to be moved to open position, a pin rotatively and slidably mounted in said plate with one end supported adjacent to the inner edge of the lower end of said latch bar when said latch bar is in engagement with said cam, and hand actuated means for forcing said pin outwardly to cause the latch bar to disengage the cam regardless of its angular position of movement.

5. In a device of the class described, a supporting plate, a pair of switch actuating bars adapted to be moved to either open or closed positions, yieldable means for moving said actuating bars to their open positions, hand actuated means for moving said actuating bars to a closed position, said yieldable means including a latch bar for supporting said actuating bar in a closed position against the action of said spring, a cam shaft, a cam for said shaft adapted to rotate in either direction from a neutral position and to engage and release said latch bar as the said cam shaft is returned to its neutral position, means controlled by the steering mechanism of an automobile for actuating said cam shaft, and hand actuated means for releasing said latch bar independently of the action of said cam.

ARTHUR C. VAN HOUWELING.
EDWARD S. COOK.